United States Patent [19]

Even et al.

[11] Patent Number: 5,298,314

[45] Date of Patent: Mar. 29, 1994

[54] MC4 UNSATURATED POLYESTER RESIN SYSTEM

[75] Inventors: Thomas E. Even, Memphis; Stephen K. Bishop, Ardmore, both of Tenn.; Lewis M. Perkey, Chesterland, Ohio

[73] Assignee: Glasteel Industrial Laminates, Inc., Collierville, Tenn.

[21] Appl. No.: 756,203

[22] Filed: Sep. 10, 1991

[51] Int. Cl.$^5$ .............................................. C08L 67/06
[52] U.S. Cl. .................................... 428/245; 428/288; 525/27; 525/36; 525/43; 525/44; 523/514; 523/516; 523/521; 523/527
[58] Field of Search .................. 428/245, 288; 525/27, 525/36, 43, 44; 523/527, 514, 516, 521

[56] References Cited

U.S. PATENT DOCUMENTS 4,873,274 10/1989 Cummings .......................... 523/500
4,943,474 7/1990 Tsunemi ............................. 428/246
5,077,326 12/1991 Shibata .............................. 523/523

OTHER PUBLICATIONS

G. Luben, Handbook of Composites pp. 17-20 Van Nostrand Reinhold Co. N.Y. (1982).

Primary Examiner—Patricia A. Short
Attorney, Agent, or Firm—Spencer, Frank & Schneider

[57] ABSTRACT

An unsaturated polyester resin characterized by high performance electrical, physical and mechanical properties and useful in the electronic and microwave industries, and a process for preparing such a resin.

12 Claims, No Drawings

MC4 UNSATURATED POLYESTER RESIN SYSTEM

RELATED APPLICATIONS

This application is related to concurrently filed applications "Copper-Clad MC4 Unsaturated Polyester", Ser. No. 07/756,204, and "ADCORE Bonding Sheets", Ser. No. 07/756,202, both of which are incorporated herein by reference.

BACKGROUND OF THE INVENTION

1. Field of the Invention

The present invention relates to an unsaturated polyester resin system which is a high performance electrical insulation material useful in the electronic and microwave industries, and a process for preparing such resins.

2. Technology Review

Electrical circuit boards are prepared by laminating sheets of electrical conducting material, such as (but not limited to) copper, onto a base or support of insulation material. The reliability of performance for the finished circuit board depends to a great degree on the physical, mechanical and electrical characteristics of the support material itself. Ideally, this support material would be chemically resistant to acids and possess a high Tg, a low dielectric constant, a high comparative tracking index, a low coefficient of thermal expansion, high surface and volume resistivity and could additionally be processed with conventional manufacturing procedures.

In general, electrical insulation materials many times contain a structural reinforcement, such as glass fibers, to improve the material strength of the product. Depending on the particular resin and intended use of the board, these reinforcements may be either woven or non-woven, and may be dispersed throughout the resin in either a randomly oriented or non-randomly oriented fashion. For example, an electrical-grade glass mat sheet is representative of a woven, non-random support, whereas randomly distributed, chopped glass fiber is an example of a non-woven, randomly oriented support. Standards for polyester glass-mat sheets have been established by the National Electrical Manufacturer's Association. Both organic and inorganic materials are suitable as a structural reinforcement. Additionally, other fillers may be incorporated in the support material.

Electrical insulation materials, especially those in circuit boards, also frequently contain flame retardants. These flame-retardant may be chemicals that can be incorporated in the form of a monomeric unit during the curing of the resin. Alternatively, flame-retardant monomers may be incorporated in the production of the base resin. Examples of monomeric flame retardant materials are brominated, chlorinated or other halogenated vinyl monomers. For example, Dibromostyrene (DBS), available from Great Lakes Chemicals, El Derado, Ark., is a suitable brominated vinyl monomer. The flame retardant materials may also either be organic, as in the case of the above-mentioned monomers, or may be inorganic. Aluminum trihydrate is representative of an inorganic flame retardant suitable for use in electrical circuit board supports.

Of the physical characteristics upon which circuit board reliability depends, one of the most critical is the magnitude of z-axis expansion during thermal cycling. The electrical insulation materials which possess a high coefficient of thermal expansion expand to a much greater degree than the metal hole barrels, resulting in the deformation of the barrels and subsequently a substantial number of failures in the circuit boards. This failure due to high z-axis expansion is magnified in double-sided boards due to the high concentration of resin in these boards. Generally, the number of failures can be expected to increase with increasing number of thermal shock cycles, but the number of failures may be reduced somewhat by a prebake of the material.

An additional problem associated with certain electrical insulation materials is that the z-axis expansion increases at a much higher rate at temperatures above the Tg than at temperatures below the Tg. Such a characteristic of the electrical insulation material may exacerbate the aforementioned problem of metal plated through hole failures. As a result, electrical insulation materials that have both a relatively high Tg and a relatively low rate of change in z-axis expansion above the Tg would be preferred. Thus, although it is difficult to greatly change the expansion properties of a material, much effort has been placed in achieving even modest improvements in this property.

There are two general types of electrical insulation support materials for high performance uses currently employed in the electronic circuit board industry: those based on epoxy resins and those based on much more expensive materials. The epoxy electrical insulation resins, exemplified by FR4 resin, have the particular advantages of both ease of processing and low cost of manufacture. For example, the manufacture of laminates comprising epoxy resins can be highly mechanized. Along with the low cost of base materials, this mechanization results in superior production costs as compared to other generally used electrical insulation support materials. The highly favorable cost and processing advantages of the epoxy resins are substantially offset, however, by the physical and electrical properties of these materials. For example, FR4 epoxy resin has a z-axis expansion of 55 to 80 ppm/°C. below Tg and of 250° to 400 ppm/°C. above Tg. This expansion corresponds to about 2.2% to 3.0% between 40° C. and 180° C., and about 4.4% between 20° C. and 260° C. Such expansion properties do not compare well with that of copper, which expands at about 18 ppm/°C. Additionally, FR4 possesses a relatively low Tg of about 120° C. The poor electrical properties of FR4 and similar resins include a relatively high dielectric constant of about 4.8, a relatively high dissipation factor of about 0.020, a relatively low minimum surface resistance of $5 \times 10^3$ megohms and a relatively low volume resistivity of $1 \times 10^5$ megohm-cm. As is known to one skilled in the art of electrical insulation materials, the aforementioned relatively poor physical and electrical properties of epoxy resin render this material unsuitable for use as an electrical insulation support in demanding applications, particularly those applications involving high temperature manipulations or operations.

The second general class of electrical insulation materials, the "high performance" insulation materials, overall have physical and electrical properties superior to those of epoxy resin systems. The high performance resins generally possess a relatively low z-axis expansion, a relatively high Tg, a relatively low dielectric constant, and relatively high surface and volume resistivity. Examples of high performance electrical insulation materials are those made of polyimide, cyanate ester and PTFE TM (Dupont). By "high performance electrical insulation material" it is meant that the electrical insulation material has a plurality of physical and electrical characteristics which render the resin superior to that of a traditional epoxy resin in electrical and related applications. For example, polyimide resins can withstand repeated exposure to temperatures up to 260° C., the temperature of a liquid solder bath, with generally a lower number of failures in metal plated through holes due to temperature stress. This is because, for example, polyimide possesses a relatively high Tg of 205° C., and a z-axis expansion below Tg of 49 ppm/°C., and that above the Tg of 195 ppm/°C. This expansion corresponds to about 0.7% between 40° C. and 180° C. The electrical properties of the high performance electrical insulation materials are also generally superior to those comprising epoxy resins, although expensive enhancement to the epoxy can bridge this gap. As an example of the superior electrical properties of high performance materials, polyimide has a relatively low dissipation factor at 1 MHz of 0.011.

The primary drawbacks associated with the high performance electrical insulation materials is that the cost of laminates comprising these materials is prohibitively high for general use in the electronics industry. For example, in addition to the relatively high cost of base materials, the high performance electrical insulation materials are very difficult to process, resulting in low yields of the final product. Additionally, the dimensional stability of the high performance materials is much less than that of even FR4 during processing, since the shrinkage is not radial as in the epoxy resins, but rather uni-directional. The high performance electrical insulation materials are also inert to most available conditioning processes for the through hole wall, which contributes substantially to the number of plated metal through hole failures.

Resins consisting of unsaturated polyester alone have not been generally useful as an electrical insulation material for several reasons including excessive brittleness and unacceptable levels of z-axis expansion. In the absence of a large amount of monomer, a completely unsaturated polyester resin is highly reactive, resulting in a very brittle resin. This brittleness makes processing these resins very difficult, particularly when thinness is desired as, for example, in use as an electrical circuit board support. Additionally, any cracks that develop in products made with these resins subsequently propagate throughout the product. In the presence of the amount of monomer needed to overcome the brittleness of unsaturated polyester resins, the resins then becomes too flexible and expandable, with the result that the z-axis expansion becomes unacceptable for applications or processes in which the temperatures encountered vary greatly or are extremely high. For example, similar to the epoxy resins, under the high temperature conditions encountered in the processing of electrical circuit boards, an unsaturated polyester support leads to failure in a substantial number of the metal plated through holes. A further potential drawback to the use of unsaturated polyester resins is that the conducting metal foil of an electrical circuit board does not generally bind strongly to the resin. Use of adhesion promoters will, however, substantially overcome this bond strength problem. For example, U.S. Pat. No. 4,093,768 discloses that when the adhesion promoter benzotriazole is incorporated into an unsaturated polyester resin at up to about 2% by weight, then a copper foil can be directly pressure bonded to the resin. However, due to limitations such as those described above, it was not possible to make reliable materials for general use and with acceptable electrical insulation properties from unsaturated polyester resins. The same disadvantages associated with the polyester resins and epoxy resins, also hold true for mixed polyester/epoxy resins.

As a result of the various advantages and disadvantages associated with the known electrical insulation materials, one in the art must determine which type of material to employ based upon the specific final application. Particularly when cost is a predominant factor in this determination, one is constrained to the use of the lower performance materials of the epoxy or similar type. In other cases, one is confined to use the high performance materials, regardless of the cost, to satisfy the requirements of the particular processing or final application.

There thus exists a great need for discovering materials which are suitable for general use as an electrical insulation support and which have both the excellent physical and electrical properties of the high performance materials as well as the low cost and ease of processing of the epoxy and similar type resins.

SUMMARY OF THE INVENTION

The invention provides an unsaturated polyester resin, characterized as a high performance electrical insulation material, which is useful in the electronic and microwave industries. The product of the invention is both economical and easily processed within existing industry methods. A fully unsaturated polyester is first chemically modified to generate a partially unsaturated polyester. A blend comprising this partially unsaturated polyester, a completely unsaturated polyester and a vinyl monomer is then prepared. The blend of the present invention may also contain fillers and/or a structural reinforcement, which may be woven or non-woven, randomly or non-randomly oriented with respect to the resin, and comprising either organic or inorganic material. A flame-retardant material may also be incorporated into the resin blend of the present invention. Adhesion promoters, which aide in the bonding of metal to the resin, may also be included in the blend. The polyester blend is cured through a multi-tiered catalyst system.

The process of the invention provides an unsaturated polyester resin which is a high performance electrical insulation material and is useful in the electrical and microwave industries.

DETAILED DESCRIPTION OF THE INVENTION

It is one object of the present invention to develop a system for use as electronic circuit boards, low impedance microwave boards, E.M.I.-R.F.I shielding and other applications, which would combine the low cost and ease of processing of the epoxy type systems with the superior electrical properties of the high performance systems. The discovery of the present invention relates to the unexpected finding that an unsaturated polyester resin blend can be made to possess high performance properties previously reserved for materials that are both much more costly and much more difficult to process than polyesters. Two of the great advantages of such a polyester-based, high performance electrical insulation material are that the processing is readily performed in systems designed for existing epoxy-based manufacturing and the cost is comparable to that of these relatively inexpensive systems.

The completely unsaturated polyester resin used herein may generally be described as a linear polyester resin capable of cross-linking with vinyl monomers and thereby to other polyester chains, to form copolymers. The partially unsaturated polyester resin is generally the result of chemical modification of a completely unsaturated polyester resin, as described above, such that much of the unsaturation is removed. The base completely unsaturated and partially unsaturated polyesters of the present invention are combinations of glycols and dibasic acids. In the process and product of the present invention, suitable glycols are propylene glycol, ethylene glycol, dipropylene glycol, diethylene glycol and the like. Suitable dibasic acids are phthalic anhydride, isopthalic anhydride, maleic anhydride, maleic acid, adipic acid, fumeric acid and the like.

In order to overcome the brittleness problem inherent in the completely unsaturated polyester resin systems, a great deal of the unsaturation is first removed from the base polyester chain by chemical modification. For example, such a chemical modification as the reaction of the fully unsaturated polyester chain with dicyclopentadiene is preferred in the process of the present invention. This chemically-modified polyester may, but need not, be additionally reacted with vinyl monomers such a styrene to lower the viscosity of the resin and facilitate subsequent processing. In the most preferred embodiment of the present invention, the base polyester which has been chemically modified as above, is polyester resin 67, which is available from The Alpha Corp., Collierville, Tenn. The degree of unsaturation of the partially unsaturated polyester of the present invention is approximately 55% that of a completely unsaturated polyester. However, as discussed below, other degrees of unsaturation ranging from about 20% to about 70%, by weight as compared to the total weight of resin, are also contemplated in the process and product of the present invention. Additionally, although the chemical modification using dicyclopentadiene is preferred in the process and product of the present invention, it should be appreciated that any chemical modification which substantially reduces the unsaturation in a polyester chain is suitable to produce the partially unsaturated polyester resin of the present invention.

The chemical modification of the completely unsaturated polyester creates a partially unsaturated polyester system designated "System I", which is less reactive than a completely unsaturated polyester resin as a result of the modification. The System I polyester is then blended together with a completely unsaturated polyester, the latter of which is designated "System II". By "completely unsaturated polyester" it is meant a standard polyester that has not been chemically modified to remove the unsaturation present in the chain. By a polyester resin "System" it is meant a polyester resin which is a component of a mixture comprising a plurality of polyester resins, wherein the polyester resins in the mixture are distinct from one another with respect to chemical composition and/or degree of unsaturation of the polyester chains. Standard production resins may be used for either or both the System I or System II polyesters and the completely unsaturated precursor of the System I polyester may, but need not, be based on the same monomeric units as the System II polyester. The invention thus contemplates both homo- and heteropolymeric unsaturated polyester resin blends. In the preferred process and product of the present invention, the completely unsaturated, System II polyester is resin 78, also available from The Alpha Corp., Collierville, Tenn. Since the System I polyester is relatively less reactive than the System II polyester, when the two Systems are blended together in the appropriate ratio in producing the semi-unsaturated polyester resin blend, much of the highly unfavorable brittleness of a completely unsaturated polyester is eliminated.

A blend of more than two polyester Systems is also contemplated by the present invention. For example, in certain applications of the present invention, one may prefer a three System resin in which System III is a second, chemically distinct, completely unsaturated polyester resin, incorporated in the blend in partial replacement of the completely unsaturated System II polyester. A resin blend of the present invention comprising such additional System resins may further enhance the beneficial electrical, physical or mechanical properties of the product of the present invention. Other resins heretofore used as electrical insulation supports, such as epoxy, cyanate ester and polyimide may be incorporated in the resin blend of the present invention, but the preferred resin blend is made of polyesters alone as described herein.

The present invention additionally contemplates a process and product wherein both the System I and System II resins are partially unsaturated, although not necessarily to the same extent. As would be appreciated by one skilled in the art of resins, the important characteristics of the unsaturated polyester resin blend of the present invention are that the totality of the individual Systems when blended together, result in a composition that is sufficiently unsaturated to permit extensive interchain bonding, and so relatively low expansion properties, while at the same time being sufficiently saturated to prevent the high reactivity and therefore brittleness of the material.

In the product and process of the present invention using the preferred base polyester resins, it has been found that about a 20% by weight minimum of partially unsaturated System I polyester, as compared to the total weight of resin, is required to obtain the product of the present invention with the desired physical, electrical and mechanical properties. Acceptable blends between base polyesters in the present invention are from about 20% to about 70%, by weight, partially unsaturated polyester (System I) and from about 80% to about 30%, by weight, completely unsaturated polyester (System II), as compared to the total weight of resin. A preferred composition is from about 40% to about 60%, by weight, System I polyester and from about 60% to about 40%, by weight, System II polyester, both as compared to the total weight of resin. In the most preferred process and product of the present invention, System I polyester comprises from about 45% to about 55%, by weight, and System II polyester comprises from about 55% to about 45%, by weight, both as compared to the total weight of resin.

A vinyl monomer is also included in the blend of the System I and System II resins. The blend of a System I polyester resin with a System II polyester resin, both as a general polyester resin "System" as defined above, and a vinyl monomer is referred to as a "semi-unsaturated" polyester resin blend. In one preferred embodiment of the invention, the vinyl monomer is chosen to be one which is highly reactive, such that all the monomer can subsequently be reacted and the processing of the material facilitated. In the preferred product and process of the present invention, the vinyl monomer comprises divinyl benzene and equivalent derivatives thereof. The highly reactive monomer incorporated in the blend with the System I and System II resins in the present invention also preferably possesses flame-retardant characteristics. Typical flame retardants are brominated, chlorinated or other halogenated vinyl monomers. The inclusion of the flame-retardant feature in the vinyl monomer is generally preferred the present process as it allows one to practice the invention using System I and System II polyester chains which do not have these more expensive monomers incorporated therein. The cost of producing the unsaturated polyester of the present invention is thereby reduced when the final application does not require the flame-retardant feature by using vinyl monomers lacking this feature. As an alternative to the use of flame-retardant vinyl monomers, other flame-retardant materials, either organic or inorganic, may be incorporated into the polyester resin blend of the present invention.

In the process and product of the present invention, flame retardants such as brominated vinyl monomers are incorporated in amounts ranging from about 5% to about 40%, by weight bromine, as compared to the weight of the semi-unsaturated resin blend. Inorganic flame retardants, such as aluminum trihydrate, may also be incorporated in the blend of the present invention. In a preferred embodiment, the flame-retardant vinyl monomers are incorporated in the range of from about 13% to about 33%, by weight bromine, as compared to the weight of the semi-unsaturated resin blend. In the most preferred process and product of the present invention, the flame-retardant vinyl monomer is incorporated in from about 17% to about 28%, by weight bromine, as compared to the weight of the semi-unsaturated resin blend.

Structural reinforcements may also be included in the blend of the present invention. Glass is particularly useful as a structural reinforcement because of its high tensile strength, high modulus of elasticity, ability to be formed in small diameter fibers, inertness, and low specific gravity compared to equally strong fibers. Chopped glass fiber strands may be randomly oriented in the resin layer, or these fibers may be placed in the resin in a non-random way, such as in parallel arrays. In one preferred process of the present invention, glass fibers are chopped into filaments about 3 cm. long, and randomly distributed into the polyester resin layer. The resulting structural reinforcement is thus randomly oriented with respect to the resin. In general, when a structural reinforcement of unwoven glass fibers is deemed appropriate in the product and process of the present invention, the weight of the glass fiber filaments distributed into the polyester resin is from about 10% to about 30%, by weight, as compared to weight of the resin, preferably by about 10% to about 20%, by weight, as compared to the weight of the resin, and most preferably from about 12% to about 15%, by weight, as compared to the weight of the resin. In another preferred embodiment of the present invention, a mat of electrical grade glass fibers weighing from about 0.025 ounces to about 12 ounces per square foot is uniformly applied to the polyester resin layer. This second preferred embodiment exemplifies a woven, non-random structural reinforcement. The woven glass in the present invention may also be either continuous or non-continuous, and is preferred in the product and process of the present invention to comprise less than 60% glass, by weight, as compared to the weight of the resin blend. Additionally, the structural reinforcement may be either organic or inorganic. The glass fibers and glass mats are examples of inorganic reinforcements. Additional inorganic structural reinforcements suitable for use in the present invention are quartz fibers and Kevlar TM fibers. Examples of suitable organic structural reinforcements under the product and process of the present invention are carbon fiber, cellulose fiber, polyester fiber and cloth.

Fillers may also be added to the blend of System I and System II polyesters and the vinyl monomer. Typical fillers include Georgia kaolin, fused silica, aluminum trihydrate, nepheline, CA-5 calcium sulfate, and Scotchlite TM (3M Corp.) glass microspheres. The fillers of the present invention may also be either organic or inorganic materials containing catalysts for the additive plating of copper, or other electrical conductor, onto the substrate. An example of such a filler is CAT 10, which uses palladium on Koalin clay for making electroless copper deposits as, for example, in the Koll-Morgan CC4 TM additive process. The use of fillers may improve both the electrical and mechanical properties of the final resin while at the same time substantially reducing the cost of materials. In the process of the present invention the filler comprises from about 0 parts to about 50 parts, by weight, per 100 parts by weight of the semi-unsaturated resin blend. Preferably, the filler comprises from about 0 to about 30 parts by weight, per 100 parts by weight of the semi-unsaturated resin blend. Most preferably the filler comprises from about 0 to about 20 parts by weight, per 100 parts by weight of the semi-unsaturated resin blend.

Adhesion promoters are also generally added to the polyester resin blend to increase the bonding strength of the conductive metal foil to the unsaturated polyester resin. Examples of suitable adhesion promoters are methyl acrylic acid (MAA), or other acids, or sodium silicate. when the application of the product and process of the present invention may require an adhesion promoter, as in the case of electrical circuit boards, the addition of MAA to the resin blend of the present invention, at a concentration of about 5%, by weight as compared to the weight of the semi-unsaturated resin blend, has been found to remarkably improve the peel bond strength of a copper-clad laminate of the unsaturated polyester of the invention and is thus preferred in the process and product of the present invention.

Besides the nature of the raw materials that go into the polyester resin, the system of catalysis has also been found to be critical for achieving the desired final properties of the resin. One factor central to the present invention is that different catalysts have different half-lifes at a given temperature. Additionally, different catalysts have different optimum temperatures at which they initiate free radical reactions. Thus, as detailed below, curing processes over the course of which different temperatures are desired, can be controlled by the active catalyst present at any given step.

In order for the system to be useful for production of extremely thin boards, each with the same cure characteristics, a multi-tiered, free-radical based system of catalysis has been developed and forms an integral part of the present invention. By "multi-tier" and "multi-tiered" catalyst system, it is meant that in which a plurality of temperature levels and catalysts are used in the catalytic process of curing a resin, such that this process occurs in a step-wise fashion, with each step primarily catalyzing a different reaction between the components of the blend and different catalysts primarily catalyzing each of the different steps. The initiation of each step in the multi-tiered catalyst system of the present invention is controlled by the temperature of the reaction and the characteristics of the catalysts present in the blend. The step-wise nature of the multi-tiered catalyst system of the present invention is accomplished by choosing a system of catalysts which have overlapping reactivity temperatures but whose half lifes at the chosen temperatures differ greatly. One primary consideration in the choice of catalysts used in the multi-step catalytic system of the present invention is that the activity of the catalyst for any given temperature step is significantly enhanced at the temperature of the following catalytic steps (i.e., the catalyst has a very short half-life at the subsequent temperature). Additionally, all but the lowest end (first active) catalyst are chosen such that their activity is very low at the temperature of the low end (first) catalytic step (i.e., the catalysts have a very long half-life at the low end catalytic step). For example, in a three-tiered catalyst system, three catalysts are selected such that the half life of the first, low end, catalyst at a first temperature is in minutes, while the half life of the second, middle tier, and third, high end, catalysts are in hours at this first temperature. At the second, higher temperature, the half life of the low end catalyst is in seconds, while the half life of the second catalyst is in minutes and the half life of the third, high end, catalyst is substantially greater than that of the middle tier catalyst.

In a multi-tiered catalytic system in the present invention, the low end catalyst triggers and maintains the reaction of the vinyl monomer, most preferably a halogenated divinyl benzene derivative, to the polyester chain. This reaction is preferably carried out at a temperature of from about 95° C. to about 120° C., such that the reaction is at a temperature below the boiling point of the vinyl monomer. At temperatures higher than this preferred range, there is an inadequate number of monomer linkages to the polyesters in the blend, and during the subsequent exotherm, products comprising a substantial amount of poly(monomer) and a substantial amount of the polyester chains bonded together by poly(monomer), are formed. Such poly(monomer) containing products are undesirable for the intended use of the product of the present invention. Below the preferred temperature range for the low end catalytic step, the low end catalyst is not sufficiently active, such that the addition of monomers to the polyesters in the blend is too slow a process. By choosing middle tier and high end catalysts which are relatively stable (a half life of greater than one hour) in the temperature range from about 95° C. to about 120° C., auto-acceleration of the reaction system from the low end tier to the exotherm is prevented. Alternatively, catalysts with half lifes of greater than 10 minutes at these higher temperatures could be employed in the product and process of the present invention, provided that such catalysts are very slow to react. It would be recognized, however, by one skilled in the art of curing resins, that the aforementioned limitation to the temperature ranges at this step can be overcome by increasing the pressure under which the low end cure reaction is taking place.

To initiate the second stage of the curing reaction in the multi-tiered catalyst system of the present invention, the temperature is raised, preferably to from about 130° C. to about 170° C. At this temperature, any remaining low end catalyst is quickly consumed, while the middle tier catalyst is in a preferred range for initiating further reactions, and thus helping to initiate the exotherm of the reaction. The middle tier catalyst also helps maintain the reactions between polyester chains. However, in the multi-tier catalyst system of the present invention the middle tier catalyst has a relatively short half-life in the temperature range of from about 130° C. to about 170° C., and thus will be consumed before the reaction has gone to completion. The high end catalyst, having a relatively long half-life at this higher temperature, provides the free radical generation to drive the cure reaction to completion, and thereby eliminating any unreacted monomer in the blend as well as any double bonds contained in the reacted polyester chains. The high temperature of the highest tier of the reaction is additionally preferred as this temperature increases molecular mobility of the chains as they cross-link in the final stages of the reaction, thereby resulting in very few chains that are not sufficiently cross-linked to other chains.

In the preferred product and process of the present invention, the low end catalyst in the multi-tier catalyst system is tert-butyl peroctoate, which has a half life of about 15 minutes at 105° C. and a half-life of about 20 seconds at 145° C. The preferred middle-tier catalyst of the present invention is tert-butyl perbenzoate, which has a half-life of about 10 hours at 105° C. (i.e., the catalyst is essentially inactive) and a half-life of about 8 minutes at about 145° C. The preferred high end catalyst of the present invention is dicumyl peroxide which has a half-life of greater than 40 hours at about 105° C. (essentially inactive) and a half-life of about 30 minutes at 145° C. Although these catalysts are preferred for the product and process of the present invention, it would be readily apparent to one skilled in the art of resin curing that many other catalyst combinations could be employed for use in any tier of the multi-tier catalyst system so long as that catalyst possesses the appropriate activation temperature and half life, as exemplified above, for that tier.

In the multi-tier catalyst system of the present invention, the time of reaction at each of the temperatures is another critical processing parameter. In the process of the present invention between from about 2 minutes to about 4 minutes is preferred for the reaction between the vinyl monomers and the polyester chains. At times shorter than this preferred time, not enough monomer has reacted with the resin, resulting in the same unwanted situation as when the temperature at this step is below the preferred range. At times greater than that preferred, the reaction of monomers with the polyester resin is essentially complete, and time is wasted in the process of the invention. The time at temperature for the middle and high tiers of the multi-tier system of catalysis must be kept long enough such that the resin is essentially completely cured. In the preferred process of the present invention, this time is from about 4 minutes to about 11 minutes. A time at temperature shorter than that preferred may result in a product that does not have the desired electrical and physical characteristics, as the amount of reactivity and inter-chain cross-linking will not be maximized. It should be recognized by one skilled in the art of curing resins, that for applications that do not require the most superior physical and electrical properties of the product of the present invention, and when cost is a major consideration, a time at temperature less than that preferred for the final curing step may be economically appropriate.

The process and product of the present invention are not meant to be limited to the preferred three-tiered or four-tiered catalytic system, as higher numbers of catalytic tiers can be used to generate the product of the invention. With the use of a higher number of catalysts, smaller temperature steps could be optimized and used. However, it is envisioned that much greater than four steps would result in the heat generated in the reaction increasing at a sufficiently high rate such that too much catalyst would be initiated, a subsequently react with itself to form undesirable low boiling point by-products.

An example of when a fourth tier of catalysis might be useful is when the temperature at exotherm is not maintained for a sufficiently long time without the inclusion of the fourth catalyst. In this case, the inclusion of a fourth, higher tier catalyst may assist in achieving the desired final properties of the product of the invention. If, however, the temperature at exotherm is maintained sufficiently long, the reaction will be complete and no post-cure would be required. Under these latter conditions a fourth, yet higher tier catalyst incorporated in the blend would not improve the product. In the process of the invention, sufficient amounts of the high end catalyst may remain present following the completion of the reaction and later removed by a post-cure step, but neither post-cure nor excess catalyst for a post-cure are generally required for the process and the product of the present invention, and the inclusion or exclusion of such steps is dependent upon the specific final use of the product as is known in the art of resins. When applicable, the resin can be prebaked at a temperature of about 350° C. for about 4 hours, if the final application so requires, as is known in the art of electrical insulation materials.

Due to the unique combination of materials and steps in the process of the present invention, the polyester resin thereby produced is superior to all previously available low cost electrical insulation materials, to the point that this new electrical insulation support is highly competitive with the high performance electrical insulation materials. For example, the resin of the present invention has a z-axis expansion between 40° C. and 180° C. of only about 1.2% to about 1.9%, depending upon the conditions employed. The glass transition temperature of the polyester resin of the present invention is between about 140° C. and 180° C., and is much smoother than that of FR4 epoxy resin. For example, the z-axis expansion below the Tg is about 18 ppm/°C. while that above the Tg is only about 60 ppm/°C. This expansion property of the insulation support thus compares with the temperature dependent expansion of copper much better than do epoxy-based supports. It has also been found that the unsaturated polyester of the present invention is able to withstand thermal stress of 260° C., the temperature of molten solder, for over 50 times without substantial internal pad delamination. As a result of these superior physical properties of the product of the present invention, use of this product in electronic circuit boards results in a substantial reduction in the number of failures of metal plated through holes during processing. It should also be appreciated that the curing process disclosed herein also makes the insulation support of the present invention less apt to deform to other stresses besides temperature, such as those stresses introduced by changing pressures.

Due to the high degree of inter-chain bonding and lack of a substantial amount of reactivity, the unsaturated polyester resins of the present invention are also less brittle than are other conventional resins. Consequently, boards derived from the present unsaturated polyester resin do not crack as easily when handled nor do any cracks which do develop propagate as easily throughout the board.

In addition to the aforementioned superior physical properties, the product of the present invention also possesses electrical properties that are superior to those of FR4 epoxy. For example, the minimum volume resistivity of the insulation support of the invention is about $1 \times 10^8$ megohms-cm, while the minimum surface resistance is about $1 \times 10^8$ megohms. Additionally, the dissipation factor at 1 MHz for the insulation material of the invention is about 0.015, absent any glass structural reinforcement or fillers. The insulation support of the present invention also has a dielectric constant of 3.2 to 3.8 at 1 MHz, compared to that of 4.2 to 5.0 at 1 MHz for FR4 epoxy.

In combination, the superior physical, electrical and mechanical properties of the unsaturated polyester resin of the present invention, highly reliable yet very thin electrical components can be manufactured, allowing for new designs in circuitry. For example, due to the superior properties such as dimensional stability and high resistivity of the insulation support in the product of the present invention, highly reliable electrical insulation materials, either single- or multi-layer, can be routinely produced with a thickness of about 4 mils per layer. This novel unsaturated polyester resin is also advantageous over previously available high performance materials due to the low cost of the components of the resin and the ability to manufacture the material through existing production processes widely known in the art of epoxy resin processing. Some representative physical and electrical properties of the unsaturated polyester resin of the present invention, named MC4, are listed in Table 1, along with those of FR4 epoxy and polyimide (PI).

TABLE 1

Comparison of selected electrical insulation support materials with the MC4 material of the present invention.

| | MC4 | FR4 | PI |
|---|---|---|---|
| Glass Transition Temperature (°C.) | 140–180 | 120–130 | 265 |
| Z-axis Expansion below Tg (ppm/°C.) | 18 | 55–80 | 49 |
| Z-axis expansion above Tg (ppm/°C.) | 60 | 250–400 | 195 |
| Z-axis Expansion (40° C. to 180° C.) (%) | 1.2–1.9 | 2.2–3.0 | 0.7 |
| Dielectric Constant at 1 MHz | 3.2–3.8 | 4.2–5.0 | 4.2–4.6 |
| Dissipation Factor at 1 MHz | 0.015 | 0.045 | 0.011 |
| Volume Resistivity (minimum) (Megohm-cm) | $10^8$ | $10^5$ | *** |
| Surface Resistivity (minimum) (Megohm) | $10^8$ | $10^3$ | *** |

(*** = data not available)

It would also be appreciated by those skilled in the art of resins that, due to its outstanding physical, electrical and mechanical properties, the product of the present invention is useful for many applications. For example, the material of the present invention is useful as a dielectric spacer when used in conjunction with any commercially available bonding film, and as a core restraining material to keep other types of boards dimensionally stable, as an E.M.I.-R.F.I. shielding material and as low impedance material useful for boards in the microwave industry. Additionally, electronic circuit boards comprising the product of the present invention would be useful in the field of light weigh avionics. Overall, through use of electronic circuit boards with an electrical insulation support derived from the process and product of the present invention, the reliability of inexpensive applications of electric circuit boards will be significantly enhanced, in particular, and the cost of boards required for the more demanding applications will decrease greatly without sacrificing reliability.

EXAMPLES

The polyester resins used in the following examples are available from The Alpha Corp., Collierville, Tenn. under the names resin 67 and resin 78. Resin 67 is a partially unsaturated polyester resin preferred in the product and process of the invention and described herein, whereas resin 78 is a preferred completely unsaturated polyester resin.

Example 1

To a polyester resin blend consisting of 45%, by weight, resin 67 (System I) and 55%, by weight, resin 78 (System II), a brominated divinyl benzene derivative DBS is added at a concentration of 39% by weight monomer, corresponding to 23.4% by weight bromine, both as compared to the weight of the resin blend, and the resulting semi-insaturated blend is thoroughly mixed. To this semi-unsaturated resin blend is then added 0.2% t-butyl peroctoate (TBPO), 0.25% t-butyl peroxybenzoate (TBPB) (both available from Whitco, Memphis, Tenn.) and 0.25% dicumylperoxide (DCP) free-radical generating catalysts, each by weight as compared to the weight of the semi-unsaturated resin blend. This mixture is then applied to a flat surface by knife-coating, and the temperature is raised to 115° C. to initiate the low tier of a three-tiered catalyst system. This temperature is maintained for about 3 minutes, after which the temperature of the mixture is raised to 145° C. to initiate the second and third tiers of the multi-tiered catalyst system and the exotherm of the reaction. The unsaturated polyester resin blend is then maintained at this higher temperature for about 8 minutes. The resultant board comprising MC4 unsaturated polyester resin, is then allowed to cool to room temperature.

Example 2

A cured MC4 unsaturated polyester resin is prepared according to Example 1, with the exception that 4%, by weight, divinyl benzene was used as monomer in the semi-unsaturated polyester blend in place of the vinyl monomer styrene.

Example 3

A cured MC4 unsaturated polyester resin is prepared as in Example 1, with the additional step of pressing two layers of a woven mat of electrical grade glass fibers (#104), weighing about 0.025 ounces per square foot, in the resin after knife coating and prior to curing.

Example 4

A cured MC4 unsaturated polyester resin is prepared as in Example 3, with the exception that randomly distribute electrical grade glass fiber filaments are pressed into the resin in place of the electrical grade glass mat. The glass fibers, each about 3 cm long, are pressed into the polyester blend after the knife coating and prior to activation of the second tier catalyst. The glass fibers are added to the resin at a concentration of 15% glass, by weight, as compared to the weight of the semi-unsaturated polyester resin blend.

Example 5

A cured MC4 unsaturated polyester resin is prepared as in Example 1, with the exception that Georgia Kaolin is added to the semi-unsaturated resin blend at a concentration of 10 parts Kaolin per 100 parts semi-unsaturated resin blend. The filler is added, with thorough mixing, after the vinyl monomer and prior to knife coating.

Example 6

A cured MC4 unsaturated resin is prepared as in Example 4, with the exception that CAT 10 filler is used, at a concentration of 12.5% parts per 100 parts semi-unsaturated resin blend, in place of Georgia Kaolin. The CC4 filler is added, with thorough mixing, after the vinyl monomer and prior to knife coating.

Example 7

A cured MC4 unsaturated polyester resin is prepared as in Example 4, with the exception that Scotchlite TM glass microspheres, available from 3M, St. Paul, Minn., is used in the place of Georgia Kaolin. The glass microspheres are incorporated into the resin at 50 parts, by weight, per 100 parts by weight semi-unsaturated resin blend.

Example 8

A cured MC4 unsaturated polyester resin is prepared as in Example 1, with the exception that the methyl acrylic acid (MAA) is added to the resin blend at a concentration of 5% MAA, by weight, as compared to the weight of semi-unsaturated resin blend. The MAA is added, with thorough mixing, after the vinyl monomer and prior to knife coating.

It is understood that various other modifications will be apparent to an can readily be made by those skilled in the art without departing from the scope and spirit of this invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A curable unsaturated polyester resin blend comprising a mixture of:
    (a) from about 30 percent to about 80 percent by weight of a first unsaturated polyester resin, and
    (b) from about 70 percent to about 20 percent by weight of a second unsaturated polyester resin, having a degree of unsaturation of from about 20 percent to about 70 percent,
    wherein said first and second polyester resins are derived from glycols and dibasic acids and said first polyester resin has a higher degree of unsaturation than said second polyester resin,
    (c) a brominated vinyl monomer in an amount such that the weight bromine is from about 5 to about 40 percent by weight as compared to the total weight of said resin blend; and (d) an effective amount of a multi-tier, free-radical generating catalyst system for curing said curable polyester resin blend, said catalyst system comprising at least three catalysts wherein,
  (i) a first catalyst has a half-life of about 15 minutes at 105° C. and a half life of about 20 seconds at 145° C.,
  (ii) a second catalyst has a half-life of about 10 hours at 105° C. and a half-life of about 8 minutes at 145° C., and
  (iii) a third catalyst has a half-life of greater than about 40 hours at 105° C. and a half-life of about 30 minutes at 145° C.

2. The unsaturated polyester resin blend as set forth in claim 1, additionally comprising an organic or inorganic flame retardant.

3. The unsaturated polyester resin blend as set forth in claim 1, additionally comprising a structural reinforcement means comprising at least one organic or inorganic, woven or non-woven, randomly oriented or non-randomly oriented material.

4. The unsaturated polyester resin blend as set forth in claim 3, said structural reinforcement means comprising glass.

5. The unsaturated polyester resin blend as set forth in claim 1, additionally comprising an organic or inorganic flame retardant and a structural reinforcement means.

6. The unsaturated polyester resin blend as set forth in claim 1, additionally comprising a filler.

7. The unsaturated polyester resin blend as set forth in claim 6, wherein said filler is selected from the group consisting of Georgia kaolin, fused silica, aluminum trihydrate, nepheline, calcium sulfate, glass microspheres and a catalyzed filler for electroless addition.

8. The unsaturated polyester resin blend as set forth in claim 7, wherein said filler is a catalyzed filler for electroless addition.

9. The unsaturated polyester resin blend as set forth in claim 6, additionally comprising:
  a flame retardant; and,
  a structural reinforcement means comprising organic or inorganic, woven or non-woven, randomly oriented or non-randomly oriented material.

10. The unsaturated polyester resin blend as set forth in claim 9, wherein:
  said structural reinforcement means comprises glass; and,
  said filler is selected from the group consisting of Georgia kaolin, fused silica, aluminum trihydrate, nepheline, calcium sulfate, glass microspheres and a catalyzed filler for electroless addition.

11. The unsaturated polyester resin blend as set forth in claim 1, wherein said polyester resins are prepared from phthalic anhydride or maleic anhydride, and propylene glycol, ethylene glycol, or diethylene glycol.

12. A cured polyester resin blend made by a process comprising the steps:
  (a) providing the curable polyester resin blend according to claim 1, and
  (b) heating the resin blend of step (a) in at least two temperature steps to cure said blend.

* * * * *